United States Patent
Wen et al.

(10) Patent No.: US 12,176,490 B2
(45) Date of Patent: Dec. 24, 2024

(54) ELECTROCHEMICAL DEVICE AND ELECTRONIC DEVICE

(71) Applicant: Ningde Amperex Technology Limited, Fujian (CN)

(72) Inventors: Qian Wen, Fujian (CN); Bin Wang, Fujian (CN); Jianming Zheng, Fujian (CN); Shuai Xu, Fujian (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 618 days.

(21) Appl. No.: 17/362,556

(22) Filed: Jun. 29, 2021

(65) Prior Publication Data
US 2021/0328268 A1    Oct. 21, 2021

Related U.S. Application Data

(63) Continuation of application No. PCT/CN2019/119439, filed on Nov. 19, 2019.

(30) Foreign Application Priority Data

Feb. 21, 2019    (CN) .......................... 201910129378.4

(51) Int. Cl.
*H01M 10/0569* (2010.01)
*H01G 11/24* (2013.01)
(Continued)

(52) U.S. Cl.
CPC ........ *H01M 10/0569* (2013.01); *H01G 11/24* (2013.01); *H01G 11/28* (2013.01);
(Continued)

(58) Field of Classification Search
CPC ......... H01M 10/0569; H01M 10/0568; H01M 10/0567; H01M 10/0525; H01G 11/64;
(Continued)

(56) References Cited

U.S. PATENT DOCUMENTS

| | | |
|---|---|---|
| 2009/0274945 A1 | 11/2009 | Izawa |
| 2010/0086858 A1* | 4/2010 | Kim ................. H01M 10/0436 429/246 |

(Continued)

FOREIGN PATENT DOCUMENTS

| | | |
|---|---|---|
| CN | 101771167 | 7/2010 |
| CN | 103337659 | 10/2013 |

(Continued)

OTHER PUBLICATIONS

Ota et al., Effect of Cyclic Phosphate Additive in Non-Flammable Electrolyte, Jun. 1, 2003, Journal of Power Sources, 119-121, Abstract and p. 393 (Year: 2003).*

(Continued)

*Primary Examiner* — James M Erwin
*Assistant Examiner* — John S Medley
(74) *Attorney, Agent, or Firm* — XSENSUS LLP (57) ABSTRACT

An electrochemical device including an anode having an anode current collector and a skeleton layer, the skeleton layer being disposed in an central region on the anode current collector, and a region, not covered by the skeleton layer, on the anode current collector being provided with an insulation layer; a cathode; and an electrolyte including about 1 wt % to about 40 wt % of a sulfone compound, about 1 wt % to about 40 wt % of a phosphorus compound and about 1 wt % to about 70 wt % of a fluoroether compound, based on the total weight of the electrolyte. The electrochemical device has superior cycle performance and safety performance.

10 Claims, 3 Drawing Sheets

(51) Int. Cl.
  *H01G 11/28*     (2013.01)
  *H01G 11/60*     (2013.01)
  *H01G 11/62*     (2013.01)
  *H01G 11/64*     (2013.01)
  *H01M 10/0525*   (2010.01)
  *H01M 10/0567*   (2010.01)
  *H01M 10/0568*   (2010.01)

(52) U.S. Cl.
  CPC ............ *H01G 11/60* (2013.01); *H01G 11/62* (2013.01); *H01G 11/64* (2013.01); *H01M 10/0525* (2013.01); *H01M 10/0567* (2013.01); *H01M 10/0568* (2013.01); *H01M 2300/0022* (2013.01); *H01M 2300/0037* (2013.01)

(58) Field of Classification Search
  CPC ........ H01G 11/62; H01G 11/60; H01G 11/28; H01G 11/24
  USPC ......................................................... 429/340
  See application file for complete search history.

(56) References Cited

U.S. PATENT DOCUMENTS

| | | | |
|---|---|---|---|
| 2014/0045056 A1* | 2/2014 | Yamami | H01M 10/0567 429/188 |
| 2016/0226101 A1* | 8/2016 | Teran | H01M 10/0569 |
| 2017/0162910 A1* | 6/2017 | Katou | H01M 10/052 |
| 2018/0102522 A1* | 4/2018 | Yang | H01M 4/134 |
| 2018/0287199 A1* | 10/2018 | Shitaba | H01M 4/661 |
| 2018/0301699 A1* | 10/2018 | Liang | H01M 10/0525 |
| 2020/0091559 A1* | 3/2020 | Noguchi | H01M 10/0568 |

FOREIGN PATENT DOCUMENTS

| | | | | |
|---|---|---|---|---|
| CN | 203521537 | | 4/2014 | |
| CN | 105720304 A | | 6/2016 | |
| CN | 105789559 | | 7/2016 | |
| CN | 106340402 | | 1/2017 | |
| CN | 107946541 | | 4/2018 | |
| CN | 207250643 U | * | 4/2018 | ........ H01M 10/0525 |
| CN | 108172761 A | | 6/2018 | |
| CN | 208111570 | | 11/2018 | |
| CN | 109935783 | | 6/2019 | |
| EP | 2858164 A1 | | 4/2015 | |
| EP | 2924796 A1 | | 9/2015 | |
| EP | 3309875 A1 | | 4/2018 | |
| WO | WO-2015140912 A1 | * | 9/2015 | ............ H01M 4/131 |
| WO | 2013146359 | | 12/2015 | |
| WO | WO-2018221346 A1 | * | 12/2018 | ........ H01M 10/0568 |

OTHER PUBLICATIONS

Salvatierra, et al.; "Suppressing Li Metal Dendrites Through a Solid Li-Ion Backup Layer", Advanced Science News (www.advancedsciencenews.com), Advanced Materials, 30, 1803869, 2018, 9 pages.

Wen, Qian; First Office Action for Chinese Patent Application No. 201910129378.4, filed Feb. 21, 2019, mailed Apr. 21, 2020, 17 pages.

Wen, Qian; International Search Report and Written Opinion for PCT Application No. PCT/CN2019/119439, filed Nov. 19, 2019; mailed Jan. 23, 2020; 9 pages.

Wen, Qian; Second Office Action for Chinese Patent Application No. 201910129378.4, filed Feb. 21, 2019, mailed Aug. 17, 2020, 16 pages.

Wen, Qian; Third Office Action for Chinese Patent Application No. 201910129378.4, filed Feb. 21, 2019, mailed Sep. 30, 2020, 10 pages.

Supplementary European search report mailed Dec. 6, 2022, in European Application No. 19909642.1, 10 pages.

* cited by examiner

ELECTROCHEMICAL DEVICE AND ELECTRONIC DEVICE

CROSS REFERENCE TO RELATED APPLICATIONS

The present application is a continuation of PCT International Application No. PCT/CN2019/119439, filed on 19 Nov. 2019, which claims the benefit of priority from China Patent Application No. 201910129378.4, filed on 21 Feb. 2019, the disclosure of which is hereby incorporated by reference in its entirety.

BACKGROUND

1. Field of the Invention

The present application relates to the field of energy storage, and in particular to an electrochemical device and an electronic device, particularly a lithium metal battery.

2. Description of the Related Art

With the popularity of consumer electronics products such as notebook computers, mobile phones, handheld game consoles, tablet computers, portable power supplies and drones, people's requirements for electrochemical devices (for example, batteries) are more and more stringent. For example, people require not only the light weight but also the high capacity and long service life of the batteries. In the numerous batteries, lithium metal batteries have occupied a mainstream position in the market due to the outstanding advantages such as high energy density, high safety, low self-discharge, no memory effect, and long service life. At present, how to further improve the cycle performance of lithium metal batteries has become the focus of research and development in the field of lithium metal batteries.

In view of this, it is indeed necessary to provide an improved electrochemical device and electronic device.

SUMMARY

The embodiments of the present application seek to solve at least one of the problems in the related art to certain extent by providing an electrochemical device and an electronic device.

In an embodiment, the present application provides an electrochemical device, including: an anode, including an anode current collector and a skeleton layer, the skeleton layer being disposed in an central region on the anode current collector, and a region, not covered by the skeleton layer, on the anode current collector being provided with an insulation layer; a cathode; and an electrolyte, including about 1 wt % to about 40 wt % of a sulfone compound, about 1 wt % to about 40 wt % of a phosphorus compound and about 1 wt % to about 70 wt % of a fluoroether compound, based on the total weight of the electrolyte.

According to some embodiments of the present application, the sulfone compound is selected from one or more of the following:

$$\underset{R_1}{\overset{O}{\underset{\parallel}{\overset{\parallel}{S}}}}\underset{R_2}{\overset{O}{\phantom{\parallel}}} \text{ and} \quad (\text{Formula I})$$

$$\underset{R_3}{\overset{O\phantom{x}\phantom{x}O}{\overset{\diagdown\phantom{x}\diagup}{\underset{\phantom{x}}{\overset{S}{\square}}}}}{\phantom{xxx}}_n, \quad (\text{Formula II})$$

where:

$R_1$ and $R_2$ are each independently selected from $C_{6-26}$ aryl, halogen, $C_{1-12}$ alkyl, $C_{2-12}$ alkenyl and $C_{1-12}$ haloalkyl; and $R_3$ is selected from hydrogen, $C_{6-26}$ aryl, halogen, $C_{1-12}$ alkyl and $C_{1-12}$ haloalkyl.

According to some embodiments of the present application, the phosphorus compound is selected from one or more of the following:

$$R_4\diagdown_O\underset{\underset{O\diagdown_{R_6}}{\overset{\displaystyle O}{\overset{\parallel}{P}}}}{\phantom{xx}}O\diagup R_5, \quad (\text{Formula III})$$

where:

$R_4$, $R_5$ and $R_6$ are each independently selected from $C_{1-10}$ alkyl, $C_{2-10}$ alkenyl, $C_{2-10}$ alkynyl, $C_{1-10}$ haloalkyl, $C_{2-10}$ haloalkenyl, $C_{6-26}$ aryl, $C_{6-26}$ haloaryl and $C_{1-10}$ alkoxy.

According to some embodiments of the present application, $R_4$ and $R_5$ together with atoms to which they are attached form a cyclic phosphate having 2 to 5 carbon atoms.

According to some embodiments of the present application, the fluoroether compound is selected from one or more of the following:

$$R_7\diagdown_O\diagup R_8, \quad (\text{Formula IV})$$

where $R_7$ and $R_8$ are each independently $C_{1-10}$ haloalkyl or $C_{2-10}$ haloalkenyl.

According to some embodiments of the present application, the skeleton layer is selected from one or more of the following: porous carbon, carbon nanotubes, carbon fibers and hollow carbon spheres.

According to some embodiments of the present application, the skeleton layer is about 0.5 mm to about 50 mm from an edge of the anode current collector.

According to some embodiments of the present application, the skeleton layer has the porosity of about 30% to about 95%.

According to some embodiments of the present application, the skeleton layer has the conductivity of about $10^{-2}$ S/cm to about $10^{-8}$ S/cm.

According to some embodiments of the present application, the width of the insulation layer ranges from about 0.5 mm to about 10 mm.

According to some embodiments of the present application, the insulation layer is formed of an organic polymer material or an inorganic material, the organic polymer material being selected from one or more of the following: polyimide, polyvinyl fluoride, polyetheretherketone, polyester, polyethylene, polypropylene, polyvinylidene chloride, polytetrafluoroethylene and polyethylene terephthalate (PET), and the inorganic material being selected from one or more of aluminum oxide, aluminum hydroxide and boron nitride.

According to some embodiments of the present application, the electrolyte further includes about 0.01 wt % to about 10 wt % of an additive based on the total weight of the electrolyte.

According to some embodiments of the present application, the additive is selected from one or more of the following: vinylethylene carbonate (VEC), lithium bis(oxalate)borate (LiBOB), lithium difluoro(oxalato)borate (LiDFOB), lithium tetrafluoroborate (LiBF$_4$), methylene methanedisulfonate (MMDS), 4-trifluoromethyl ethylene carbonate, 1,3,2-dioxathiolane-2,2-dioxide (DTD), fluoroethylene carbonate (FEC), ethylene sulfite (ES), vinylene carbonate (VC), succinic anhydride (SA), propylene sulfite (PS), prop-1-ene-1,3-sultone, bis(trimethylsilyl) sulfate, lithium nitrate (LiNO$_3$), N-butyl, methylpyrrolidinium bis((trifluoromethyl)sulfonyl)imide, N-propyl, methylpiperidine bis((trifluoromethyl)sulfonyl)imide, 1,3-dioxane, 1,4-dioxane, 1,2-bis(cyanoethoxy)ethane, adiponitrile, 1,3,5-pentanetricarbonitrile, fumaronitrile and 1,2,3-tris(2-cyanoethoxy)propane.

According to some embodiments of the present application, the electrolyte includes 0.1M to 4M lithium salt, the lithium salt being selected from one or more of the following: lithium perchlorate (LiClO$_4$), lithium hexafluoroarsenate (LiAsF$_6$), lithium hexafluorophosphate (LiPF$_6$), lithium bis(trifluoromethanesulfonyl)imide (LiTFSI), lithium bis(fluorosulfonyl)imide (LiFSI), lithium bis(oxalate)borate (LiBOB), lithium difluoro(oxalato)borate (LiDFOB), lithium tetrafluoroborate (LiPF$_4$), lithium trifluoromethanesulfonate (LiTFA) and lithium difluorophosphate (LiPO$_2$F$_2$).

In another embodiment, the present application provides an electronic device, including the electrochemical device according to the embodiments of the present application.

Additional aspects and advantages of the embodiments of the present application will be described or shown in the following description or interpreted by implementing the embodiments of the present application.

BRIEF DESCRIPTION OF THE DRAWINGS

The following will briefly illustrate the drawings. Drawings necessary to describe the embodiments of the present application or the prior art will be briefly illustrated so as to facilitate the description of the embodiments of the present application. Obviously, the drawings described below only show some embodiments of the present application. For those skilled in the art, the drawings of other embodiments can still be obtained according to the structures illustrated in the drawings without any creative effort.

DETAILED DESCRIPTION

The embodiments of the present application will be described in detail below. The embodiments of the present application should not be interpreted as limitations to the present application.

Unless otherwise expressly indicated, the following terms used herein have the meanings indicated below.

As used in the present application, the term "about" is used for describing and explaining minor variations. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios and other values are sometimes presented in range formats in the present application. It should be appreciated that such range formats are for convenience and conciseness, and should be flexibly understood as including not only values explicitly specified to range constraints, but also all individual values or subranges within the ranges, like explicitly specifying each value and each sub-range.

In the detailed description and the claims, a list of items connected by the term "one or more" may mean any combination of the listed items. For example, if items A and B are listed, then the phrase "one or more of A and B" means only A; only B; or A and B. In another example, if items A, B and C are listed, then the phrase "one or more of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

As used herein, the term "alkyl" is intended to be a linear chain saturated hydrocarbon structure having 1 to 20 carbon atoms. The "alkyl" is also expected to be a branched chain or cyclic hydrocarbon structure having 3 to 20 carbon atoms. For example, the alkyl may be alkyl having 1 to 20 carbon atoms, alkyl having 1 to 10 carbon atoms, alkyl having 1 to 5 carbon atoms, alkyl having 5 to 20 carbon atoms, alkyl having 5 to 15 carbon atoms or alkyl having 5 to 10 carbon atoms. When an alkyl having a specific carbon number is specified, it may encompass all geometric isomers having that carbon number; therefore, for example, "butyl" means to include, but is not limited to, n-butyl, sec-butyl, isobutyl, tert-butyl, and cyclobutyl; and "propyl" includes, but is not limited to, n-propyl, isopropyl, and cyclopropyl. Examples of alkyl include, but are not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl, norbornyl and the like. Additionally, the alkyl group can be optionally substituted.

As used herein, the term "alkenyl" refers to a monovalent unsaturated hydrocarbyl group which may be linear-chain or branched-chain and has at least one and usually one, two or three carbon-carbon double bonds. Unless otherwise defined, the alkenyl typically contains 2 to 20 carbon atoms, for example alkenyl having 2 to 20 carbon atoms, alkenyl having 6 to 20 carbon atoms, alkenyl having 2 to 10 carbon atoms or alkenyl having 2 to 6 carbon atoms. Representative alkenyl includes, but is not limited to, ethenyl, n-propenyl, isopropenyl, n-but-2-enyl, but-3-enyl, n-hex-3-enyl and the like. Additionally, the alkenyl group can be optionally substituted.

As used herein, the term "alkenyl" refers to a monovalent unsaturated hydrocarbyl group which may be linear-chain or branched-chain and has at least one and usually one, two or three carbon-carbon triple bonds. Unless otherwise defined, the alkynyl typically contains 2 to 20 carbon atoms, for example, may be alkynyl having 2 to 20 carbon atoms, alkynyl having 6 to 20 carbon atoms, alkynyl having 2 to 10 carbon atoms or alkynyl having 2 to 6 carbon atoms. Representative alkynyl includes, but is not limited to, ethynyl, prop-2-ynyl(n-propynyl), n-but-2-ynyl, n-hex-3-ynyl, and the like. Additionally, the alkynyl group can be optionally substituted.

As used herein, the term "aryl" covers both monocyclic and polycyclic systems. A polycyclic ring may have two or more rings in which two carbons are shared by two adjacent rings (where the rings are "fused"), in which at least one of the rings is aromatic and other rings may be for example, a cycloalkyl group, a cycloalkenyl group, an aryl group, a heterocyclyl group and/or a heteroaryl group. For example, the aryl group may be a C6-C50 aryl group, a C6-C40 aryl group, a C6-C30 aryl group, a C6-C20 aryl group, or a C6-C10 aryl group. Representative aryl includes, but is not limited to, phenyl, methylphenyl, propylphenyl, isopropylphenyl, benzyl, naphthalen-1-yl, naphthalen-2-yl and the like. Additionally, the aryl group can be optionally substituted.

As used herein, the term "alkoxy" refers to a group formed by the attachment of an alkyl group to an oxygen atom. Examples of alkoxy include, but are not limited to, methoxy, ethoxy, n-propoxy, isopropoxy, n-butoxy, sec-butoxy, tert-butoxy, pentyloxy, isopentyloxy or tert-pentyloxy, heptyloxy, octyloxy, isooctyloxy, nonyloxy, decyloxy, undecyloxy, dodecyloxy, tetradecyloxy, pentadecyloxy, hexadecyloxy, heptadecyloxy, octadecyloxy and the like.

As used herein, the term "halogen" may be F, Cl, Br or I.

As used herein, the terms "haloalkyl", "haloalkenyl" and "haloaryl" mean that one or more hydrogen atoms of the alkyl, alkenyl and aryl are substituted by a halogen atom.

I. Anode

Various embodiments of the present application use an anode having good mechanical strength and stable chemical stability, including an anode current collector and a skeleton layer. The skeleton layer is disposed in a central region on the anode current collector, and a region, not covered by the skeleton layer, on the anode current collector is provided with an insulation layer. In some embodiments, the skeleton layer has a three-dimensional porous skeleton structure.

The skeleton structure may provide a certain space to accommodate deposited lithium metal. By using the skeleton structure, the thickness of the anode does not change significantly in a charge and discharge process of a lithium metal battery, so that the problem of interface stripping caused by thickness shrinkage can be significantly reduced. In addition, the skeleton structure greatly increases a depositable area and depositable sites of the lithium metal, so that current density per unit area is significantly lowered, thereby inhibiting the formation of lithium dendrites. The skeleton structure may also cause a free deposition process in a single vertical direction (Z direction) to become a process of simultaneous deposition in multiple directions within a restricted space, which facilitates more dense deposition.

By providing the insulation layer on an edge portion of the anode current collector, the phenomenon of uneven current distribution at an edge of the anode is effectively reduced, thereby reducing lithium dendrites induced by the uneven current density, greatly reducing the risk of a short circuit of the lithium metal battery caused by the lithium dendrites piercing a separator, and thus significantly improving the safety performance of the lithium metal battery.

In some embodiments, the skeleton layer is selected from one or more of the following: porous carbon, carbon nanotubes, carbon fibers and hollow carbon spheres.

In some embodiments, the skeleton layer is doped with one or more of the following elements: N, S, P and O. These elements may increase the affinity between the skeleton layer and the lithium metal.

In some embodiments, the element is doped in an amount of about 0.01 at % to about 10 at %. In some embodiments, the element is doped in an amount of about 0.5 at % to about 8 at %. In some embodiments, the element is doped in an amount of about 1 at % to about 5 at %.

In some embodiments, the skeleton layer is about 0.5 mm to about 50 mm from the edge of the anode current collector. In some embodiments, the skeleton layer is about 1 mm to about 30 mm from the edge of the anode current collector. In some embodiments, the skeleton layer is about 20 mm from the edge of the anode current collector.

In some embodiments, the skeleton layer has the porosity of about 30% to about 95%. In some embodiments, the skeleton layer has the porosity of about 40% to about 90%. In some embodiments, the skeleton layer has the porosity of about 50% to about 80%. In some embodiments, the skeleton layer has the porosity of about 60% to about 70%. The porosity of the skeleton layer directly affects the volumetric energy density of the lithium metal battery. If the porosity is too small, the volumetric energy density of the lithium metal battery is too low. If the porosity is too large, the structural stability of the skeleton layer becomes poor, and it is difficult to construct the skeleton layer.

In some embodiments, the skeleton layer has the conductivity of about $10^{-8}$ S/cm to about $10^{-2}$ S/cm. In some embodiments, the skeleton layer has the conductivity of about $10^{-7}$ S/cm to about $10^{-3}$ S/cm. In some embodiments, the skeleton layer has the conductivity of about $10^{-6}$ S/cm to about $10^{-4}$ S/cm. In some embodiments, the skeleton layer has the conductivity of about $10^{-5}$ S/cm to about $10^{-4}$ S/cm.

In some embodiments, the width of the insulation layer ranges from about 0.5 mm to about 10 mm. In some embodiments, the width of the insulation layer ranges from about 1 mm to about 8 mm. In some embodiments, the width of the insulation layer ranges from about 2 mm to about 6 mm. In some embodiments, the width of the insulation layer ranges from about 3 mm to about 5 mm.

In some embodiments, the thickness of the insulation layer ranges from about 5 μm to about 60 μm. In some embodiments, the thickness of the insulation layer ranges from about 10 μm to about 50 μm. In some embodiments, the thickness of the insulation layer ranges from about 20 μm to about 40 μm. In some embodiments, the thickness of the insulation layer ranges from about 20 μm to about 30 μm.

In some embodiments, the insulation layer has the resistivity of greater than about $10^7$ Ωm. In some embodiments, the insulation layer has the resistivity of greater than about $10^{10}$ Ωm.

In some embodiments, the insulation layer is selected from one or more of an organic polymer material and an inorganic material. In some embodiments, the organic polymer material is selected from one or more of the following:

polyimide, polyvinyl fluoride, polyetheretherketone, polyester, polyethylene, polypropylene, polyvinylidene chloride, polytetrafluoroethylene and polyethylene terephthalate (PET). In some embodiments, the inorganic material is selected from one or more of aluminum oxide, aluminum hydroxide and boron nitride.

In some embodiments, the anode may be made by any method known in the prior art. In some embodiments, the anode can be formed by adding a binder and a solvent to, and if necessary, adding a thickener, a conductive material, a filler, or the like the anode active material, to prepare a slurry, coating the slurry to a current collector, drying, and then pressing.

II. Cathode

The materials, composition and manufacturing method of the cathode that can be used in the embodiments of the present application include any of the techniques disclosed in the prior art. In some embodiments, the cathode is a cathode disclosed in U.S. Pat. No. 9,812,739B, which is incorporated into the present application in its entity.

In some embodiments, the cathode includes a current collector and a cathode active material layer located on the current collector. A cathode active material includes at least one lithiated intercalation compound that reversibly intercalates and deintercalates the lithium metal. In some embodiments, the cathode active material includes a composite oxide. In some embodiments, the composite oxide contains lithium and at least one element selected from cobalt, manganese and nickel.

In some embodiments, the cathode active material includes, but is not limited to:

$Li_aA_{1-b}X_bD_2$ (0.90≤a≤1.8, 0≤b≤0.5), $Li_aE_{1-b}X_bO_{2-c}D_c$ (0.90≤a≤1.8, 0≤b≤0.5, 0≤c≤0.05), $Li_aE_{2-b}X_bD_4$ (0.90≤a≤1.8, 0≤b≤0.5), $Li_aE_{2-b}X_bO_{4-c}D_c$ (0.90≤a≤1.8, 0≤b≤0.5, 0≤c≤0.05), $LiaNi1-b-cCobXcD\alpha$ (0.90≤a≤1.8, 0≤b≤0.5, 0≤c≤0.05, 0<α≤2), $Li_aNi_{1-b-c}Co_bX_cO_{2-\alpha}T_\alpha$ (0.90≤a≤1.8, 0≤b≤0.5, 0≤c≤0.05, 0<α<2), $LiaNi1-b-cCobXcO2-\alpha T2$ (0.90≤a≤1.8, 0≤b≤0.5, 0≤c≤0.05, 0<α<2), $Li_aNi_{1-b-c}Mn_bX_cD_\alpha$ (0.90≤a≤1.8, 0≤b≤0.5, 0≤c≤0.05, 0<α<2), $Li_aNi_{1-b-c}Mn_bX_cO_{2-\alpha}T_\alpha$ (0.90≤a≤1.8, 0≤b≤0.5, 0≤c≤0.05, 0<α<2), $Li_aNi_{1-b-c}Mn_bX_cO_{2-\alpha}T_2$ (0.90≤a≤1.8, 0≤b≤0.5, 0≤c≤0.05, 0<α<2), $Li_aNi_bE_cG_dO_2$ (0.90≤a≤1.8, 0≤b≤0.9, 0≤c≤0.5, 0.001≤d≤0.1), $Li_aNi_bCo_cMn_dG_eO_2$ (0.90≤a≤1.8, 0≤b≤0.9, 0≤c≤0.5, 0≤d≤0.5, 0.001≤e≤0.1), $Li_aNiG_bO_2$ (0.90≤a≤1.8, 0.001≤b≤0.1), $Li_aCoG_bO_2$ (0.90≤a≤1.8, 0.001≤b≤0.1), $LiaMnGbO2$ (0.90≤a≤1.8, 0.001≤b≤0.1), $LiaMn2GbO4$ (0.90≤a≤1.8, 0.001≤b≤0.1), $QO_2$, $QS_2$, $LiQS_2$, $V_2O_5$, $LiV_2O_5$, $LiIO_2$, $LiNiVO_4$, $Li_{(3-f)}J_2(PO_4)_3$ (0≤f≤2), $Li_{(3-f)}Fe_2(PO_4)_3$ (0≤f≤2) or $LiFePO_4$, where, A is selected from Ni, Co, Mn and any combination thereof; X is selected from Al, Ni, Co, Mn, Cr, Fe, Mg, Sr, V, rare-earth elements and any combination thereof, D is selected from O, F, S, P and any combination thereof, E is selected from Co, Mn and any combination thereof, T is selected from F, S, P and any combination thereof, G is selected from Al, Cr, Mn, Fe, Mg, La, Ce, Sr, V and any combination thereof, Q is selected from Ti, Mo, Mn and any combination thereof; I is selected from Cr, V, Fe, Sc, Y and any combination thereof; and J is selected from V, Cr, Mn, Co, Ni, Cu and any combination thereof.

In some embodiments, the cathode active material is selected from lithium cobaltate ($LiCoO_2$), lithium nickel manganese cobalt (NCM) ternary material, lithium iron phosphate ($LiFePO_4$), lithium manganate ($LiMn_2O_4$), lithium nickel manganese oxide ($LiNi_{0.5}Mn_{1.5}O_4$) or any combination thereof.

In some embodiments, the cathode active material may have a coating on the surface thereof or may be mixed with another compound having a coating. The coating may include at least one coating element compound selected from an oxide of the coating element, a hydroxide of the coating element, an oxyhydroxide of the coating element, a bicarbonate of the coating element and a hydroxycarbonate of the coating element. The compound used for the coating may be amorphous or crystalline.

In some embodiments, a coating element contained in the coating may include Mg, Al, Co, K, Na, Ca, Si, Ti, V, Sn, Ge, Ga, B, As, Zr or any combination thereof. The coating may be applied by any method as long as the method does not adversely affect the performance of the cathode active material. For example, the method may include any coating method known in the art, such as spraying, dipping, or the like.

The cathode active material layer further includes a binder, and optionally includes a conductive material. The binder improves the bonding of the cathode active material particles to each other, and also improves the bonding of the cathode active material to the current collector.

In some embodiments of the present application, the binder includes, but is not limited to, polyvinyl alcohol, hydroxypropyl cellulose, diacetyl cellulose, polyvinyl chloride, carboxylated polyvinyl chloride, polyvinyl fluoride, ethylene oxide containing polymers, polyvinylpyrrolidone, polyurethane, polytetrafluoroethylene, poly(1,1-difluoroethylene), polyethylene, polypropylene, styrene butadiene rubber, acrylated styrene butadiene rubber, epoxy resin, and nylon.

In some embodiments, the conductive material includes, but is not limited to, a carbon-based material, a metal-based material, a conductive polymer and a mixture thereof. In some embodiments, the carbon-based material is selected from natural graphite, artificial graphite, carbon black, acetylene black, Ketjen black, carbon fibre or any combination thereof. In some embodiments, the metal-based material is selected from metal powder, metal fibers, copper, nickel, aluminum and silver. In some embodiments, the conductive polymer is a polyphenylene derivative.

In some embodiments, the current collector may be aluminum, but is not limited thereto.

The cathode may be prepared by a preparation method known in the art. For example, the cathode may be obtained by the following method: mixing the active material, the conductive material and the binder in a solvent to prepare an active material composition, and coating the active material composition on the current collector. In some embodiments, the solvent may include N-methylpyrrolidone or the like, but is not limited thereto.

III. Electrolyte

The lithium metal is currently known to have the lowest chemical potential (−3.04V) and very high reactivity. In the lithium metal battery, if the reactivity of the electrolyte with an electrode is high or a solid electrolyte interfacial film (SEI film) formed on the surface of the electrode is unstable, the coulombic efficiency of the lithium metal battery during a cycle may be very low. For example, the lithium deposition/stripping coulombic efficiency of the 1M LiPF$_6$/EC-EMC (w:w=3:7) electrolyte system is 80% or below, and the lithium dendrites easily pierce the separator, causing potential safety hazards such as a short circuit and the like.

In order to overcome this problem, various embodiments of the present application use an electrolyte system which has high stability to lithium and has high film formation stability. The electrolyte includes a sulfone compound, a phosphorus compound and a fluoroether compound. In some embodiments, the electrolyte further includes an additive. In some embodiments, the electrolyte includes a lithium salt.

Sulfone Compound

The sulfone compound is a solvent having high oxidation resistance (having an oxidation potential of greater than 6 V), and has a high dielectric constant and a high solubility for a lithium salt. In an electrolyte system having a lithium salt with a high concentration, the use of the sulfone compound as a solvent enables a lithium metal battery to be stably cycled at a high voltage (for example, 4.53 V).

In some embodiments, the sulfone compound is selected from one or more of the following:

(Formula I)

(Formula II)

where:

R$_1$ and R$_2$ are each independently selected from C$_{6-26}$ aryl, halogen, C$_{1-12}$ alkyl, C$_{2-12}$ alkenyl and C$_{1-12}$ haloalkyl; and R$_3$ is selected from hydrogen, C$_{6-26}$ aryl, halogen, C$_{1-12}$ alkyl and C$_{1-12}$ haloalkyl.

In some embodiments, the sulfone compound of Formula I includes, but is not limited to, one or more of the following: dimethyl sulfone, vinyl sulfone, diethyl sulfone, methyl vinyl sulfone and ethyl methyl sulfone.

In some embodiments, the sulfone compound of Formula II includes, but is not limited to, one or more of the following: sulfolane, thietane-1,1-dioxide and 3-bromothietane-1,1-dioxide.

In some embodiments, the content of the sulfone compound is about 1 wt % to about 40 wt % based on the total weight of the electrolyte. In some embodiments, the content of the sulfone compound is about 10 wt % to about 30 wt % based on the total weight of the electrolyte. In some embodiments, the content of the sulfone compound is about 10 wt % to about 20 wt % based on the total weight of the electrolyte.

Phosphorus Compound

The phosphorus compound has a flame retarding effect and can effectively prevent thermal runaway after the battery is short-circuited. The phosphorus compound also has an extremely low melting point. Mixing the phosphorus compound with the sulfone compound may lower the melting point of the electrolyte and avoid the phenomenon that the electrolyte is solidified due to low temperature storage. The use of the phosphorus compound as the solvent may not only improve the temperature use window of the electrolyte, but also improve the safety performance of the lithium metal battery.

In some embodiments, the phosphorus compound is selected from one or more of the following:

(Formula III)

where:

R$_4$, R$_5$ and R$_6$ are each independently selected from C$_{1-10}$ alkyl, C$_{2-10}$ alkenyl, C$_{2-10}$ alkynyl, C$_{1-10}$ haloalkyl, C$_{2-10}$ haloalkenyl, C$_{6-26}$ aryl, C$_{6-26}$ haloaryl and C$_{1-10}$ alkoxy.

In some embodiments, R$_4$ and R$_5$ together with atoms to which they are attached form a cyclic phosphate having 2 to 5 carbon atoms.

In some embodiments, the phosphorus compound includes, but is not limited to, one or more of the following: trimethyl phosphate, triethyl phosphate, tributyl phosphate, trioctyl phosphate, triphenyl phosphate, tris(chloroethyl) phosphate, tris(1,3-dichloropropyl)phosphate and tris(trifluoroethyl)phosphate.

In some embodiments, the content of the phosphorus compound is about 1 wt % to about 40 wt % based on the total weight of the electrolyte. In some embodiments, the content of the phosphorus compound is about 10 wt % to about 30 wt % based on the total weight of the electrolyte. In some embodiments, the content of the phosphorus compound is about 10 wt % to about 20 wt % based on the total weight of the electrolyte.

Fluoroether Compound

When the concentration of the lithium salt in the electrolyte is high, the viscosity of the electrolyte becomes large. Besides, as the content of the lithium salt increases, the viscosity of the electrolyte may even reach 100 cp (mPa·s) or more. The fluoroether compound has a stable electrochemical window, and does not dissolve the lithium salt or affect the coordination of the lithium salt with the phosphorus compound. The fluoroether compound may act as a diluent. The addition of the fluoroether compound to the electrolyte can effectively reduce the viscosity of the electrolyte to less than 20 cp (equivalent to the viscosity level of a conventional electrolyte) and increase the wettability of the electrolyte to the electrode.

In some embodiments, the fluoroether compound is selected from one or more of the following:

(Formula IV)

where $R_7$ and $R_8$ are each independently $C_{1-10}$ haloalkyl or $C_{2-10}$ haloalkenyl.

In some embodiments, the fluoroether compound includes, but is not limited to, one or more of the following: bis(2,2,2-trifluoroethyl) ether, 1,1,2,2-tetrafluoroethyl-2,2,3,3-tetrafluoropropyl ether and perfluorodiethyl ether.

In some embodiments, the content of the fluoroether compound is about 1 wt % to about 70 wt % based on the total weight of the electrolyte. In some embodiments, the content of the fluoroether compound is about 10 wt % to about 60 wt % based on the total weight of the electrolyte. In some embodiments, the content of the fluoroether compound is about 20 wt % to about 50 wt % based on the total weight of the electrolyte. In some embodiments, the content of the fluoroether compound is about 30 wt % to about 40 wt % based on the total weight of the electrolyte.

Additive

In some embodiments, the additive is selected from one or more of the following: vinylethylene carbonate (VEC), lithium bis(oxalate)borate (LiBOB), lithium difluoro(oxalato)borate (LiDFOB), lithium tetrafluoroborate (LiBF$_4$), methylene methanedisulfonate (MMDS), 4-trifluoromethyl ethylene carbonate, 1,3,2-dioxathiolane-2,2-dioxide (DTD), fluoroethylene carbonate (FEC), ethylene sulfite (ES), vinylene carbonate (VC), succinic anhydride (SA), propylene sulfite (PS), prop-1-ene-1,3-sultone, bis(trimethylsilyl) sulfate, lithium nitrate (LiNO$_3$), N-butyl, methylpyrrolidinium bis((trifluoromethyl)sulfonyl)imide, N-propyl, methylpiperidine bis((trifluoromethyl)sulfonyl)imide, 1,3-dioxane, 1,4-dioxane, 1,2-bis(cyanoethoxy)ethane, adiponitrile, 1,3,5-pentanetricarbonitrile, fumaronitrile and 1,2,3-tris(2-cyanoethoxy)propane.

In some embodiments, the content of the additive is about 0.01 wt % to about 10 wt % based on the total weight of the electrolyte. In some embodiments, the content of the additive is about 0.5 wt % to about 8 wt % based on the total weight of the electrolyte. In some embodiments, the content of the additive is about 1 wt % to about 5 wt % based on the total weight of the electrolyte. In some embodiments, the content of the additive is about 2 wt % to about 4 wt % based on the total weight of the electrolyte.

Lithium Salt

In some embodiments, the electrolyte includes an about 0.1 M to about 4 M lithium salt. In some embodiments, the electrolyte includes an about 0.5 M to about 3 M lithium salt. In some embodiments, the electrolyte includes about 1 M to about 2 M of lithium salt.

The electrolyte in the embodiment of the present application has a lithium salt of a high concentration, so that the solvent is sufficiently coordinated with the lithium salt, and thus, the amount of the free solvent molecules in the electrolyte is very small. This can effectively inhibit the film formation of the solvent molecules, thereby causing the SEI film formed by the participation of the lithium metal to be more dense. In particular, such an electrolyte can effectively inhibit the growth of lithium dendrites on the anode of the lithium metal battery. On the surface of the anode of the lithium metal battery, the lithium metal is more prone to grow into large particles instead of growing in all directions, thereby effectively reducing the risks caused by lithium dendrites, such as a short circuit of the battery.

In some embodiments, the lithium salt includes, but is not limited to, one or more of the following: lithium perchlorate (LiClO$_4$), lithium hexafluoroarsenate (LiAsF$_6$), lithium hexafluorophosphate (LiPF$_6$), lithium bis(trifluoromethanesulfonyl)imide (LiTFSI), lithium bis(fluorosulfonyl)imide (LiFSI), lithium bis(oxalate)borate (LiBOB), lithium difluoro(oxalato)borate (LiDFOB), lithium tetrafluoroborate (LiPF$_4$), lithium trifluoromethanesulfonate (LiTFA) and lithium difluorophosphate (LiPO$_2$F$_2$).

IV. Separator

In some embodiments, a separator is arranged between the cathode and the anode to prevent the short circuit. The material and shape of the separator that can be used in the embodiments of the present application are not particularly limited, and may be any of the techniques disclosed in the prior art. In some embodiments, the separator includes a polymer, an inorganic substance or the like formed by a material that is stable to the electrolyte of the present application.

For example, the separator may include a substrate layer and a surface treatment layer. The substrate layer is a nonwoven fabric, a film or a composite film having a porous structure, and the material of the substrate layer is at least one selected from polyethylene, polypropylene, polyethylene terephthalate and polyimide. Specifically, a polypropylene porous film, a polyethylene porous film, polypropylene nonwoven cloth, polyethylene nonwoven cloth or a polypropylene-polyethylene-polypropylene porous composite film can be adopted.

At least one surface of the substrate layer is provided with a surface treatment layer, which may be a polymer layer or an inorganic layer, or a layer formed by mixing a polymer and an inorganic substance.

The inorganic substance layer includes inorganic particles and a binder, and the inorganic particles are selected from one or a combination of several of aluminum oxide, silicon dioxide, magnesium oxide, titanium oxide, hafnium dioxide, tin oxide, cerium dioxide, nickel oxide, zinc oxide, calcium oxide, zirconium dioxide, yttrium oxide, silicon carbide, boehmite, aluminum hydroxide, magnesium hydroxide, calcium hydroxide and barium sulfate. The binder is any one or combination of more than one selected from polyvinylidene fluoride, vinylidene fluoride-hexafluoropropylene copolymer, polyamide, polyacrylonitrile, polyacrylate ester, polyacrylic acid, polyacrylate salt, polyvinylpyrrolidone, polyvinyl ether, polymethyl methacrylate, polytetrafluoroethylene, and polyhexafluoropropylene.

The polymer layer includes a polymer, and the material of the polymer is at least one selected from polyamide, polyacrylonitrile, acrylate polymer, polyacrylic acid, polyacrylate, polyvinylpyrrolidone, polyvinyl ether, polyvinylidene fluoride and poly(vinylidene fluoride-hexafluoropropylene).

V. Electrochemical Device

The present application provides an electrochemical device, including: an anode, including an anode current collector and a skeleton layer, the skeleton layer being disposed in a central region on the anode current collector, and a region, not covered by the skeleton layer, on the anode current collector being provided with an insulation layer; a cathode; and an electrolyte, including about 1 wt % to about 40 wt % of a sulfone compound, about 1 wt % to about 40 wt % of a phosphorus compound and about 1 wt % to about 70 wt % of a fluoroether compound, based on the total weight of the electrolyte.

The skeleton layer of the anode in the embodiments of the present application may induce the lithium metal to be uniformly deposited in the pores of the skeleton layer, thereby improving the uniformity of lithium metal deposition. In addition, the anode having the skeleton structure has a high specific surface area, thereby increasing the reactive sites of the anode and the electrolyte, and increasing the number of crystal nuclei during lithium metal deposition.

The electrolyte in the embodiment of the present application may increase the size of the lithium metal deposition particles. The properties of the solvent in the electrolyte have a great effect on the deposition behavior of the lithium metal. Reducing the reactivity of the solvent in the electrolyte to lithium is advantageous for improving the size of the lithium metal deposition particles. An ether solvent has good reduction resistance and is relatively stable to lithium. The electrolyte containing an ether solvent can make the lithium metal deposition particles relatively large, and it is difficult to form dendritic lithium. Besides, by lowering the molar ratio of the solvent in which the lithium salt is dissolved to the lithium salt in the electrolyte, the solvent molecules can be almost completely coordinated with the lithium salt, thereby greatly reducing the number of free solvent molecules having high chemical reactivity to lithium, which contributes to the formation of a thin and stable solid electrolyte interfacial film (SEI film). The addition of the fluoroether compound as a diluent to the electrolyte may reduce the viscosity of the electrolyte, so that the distribution of lithium metal coordinated with the solvent molecules is more uniform in the electrolyte, and concentration polarization is also reduced.

Figure 1A:
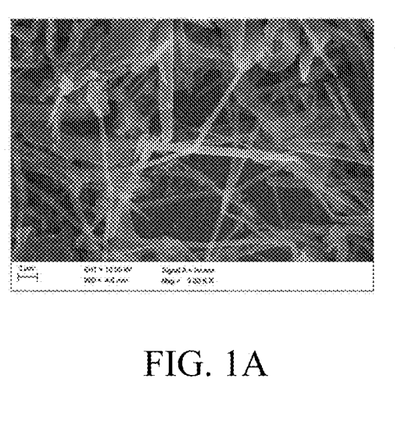
FIG. 1A shows lithium deposition morphology of a 1M LiPF$_6$/EC-EMC (w:w=3/7) electrolyte system.
Figure 1B:
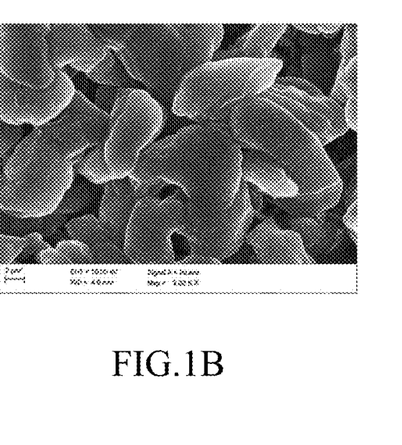
FIG. 1B shows lithium deposition morphology of an electrolyte of the present application.

Under the combined action of the above factors, the lithium metal deposited using the electrolyte of the present application exhibits massive large particle morphology (such as the massive large particle morphology shown in FIG. 1B), which apparently has a larger size than the lithium metal deposited using a conventional electrolyte (the needle-like topography shown in FIG. 1A).

The use of the electrolyte of the present application in combination with the anode having the skeleton layer reduces a contact area of the lithium metal deposited in the anode with the electrolyte, alleviates the problem of small deposition size of lithium metal particles, reduces the risk of thermal runaway caused by side reactions, enhances the first coulombic efficiency, and prolongs the cycle life.

Figure 2:
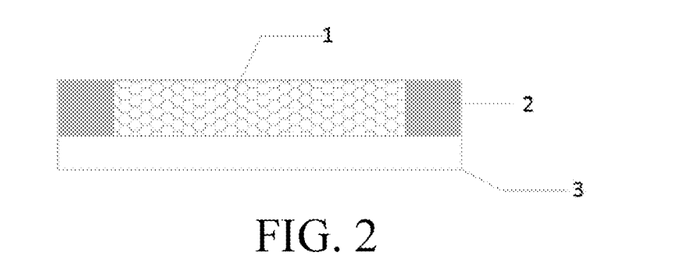
FIG. 2 shows a side view of a structure of an anode of the present application.
Figure 3:
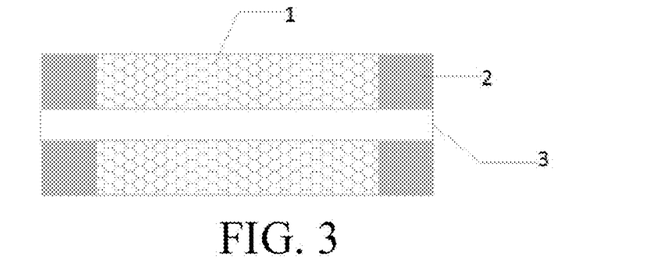
FIG. 3 shows a side view of a structure of another anode of the present application.
Figure 4:
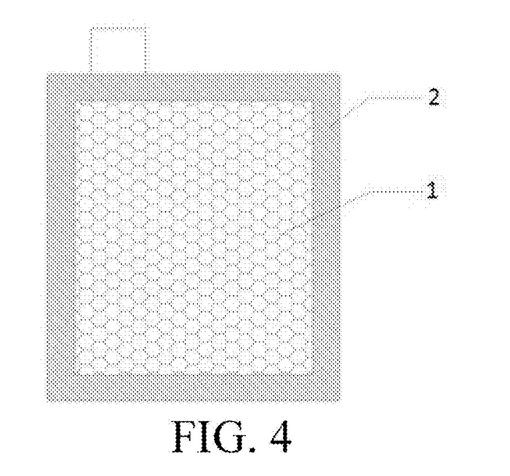
FIG. 4 shows a top view of a structure of an anode of the present application.

In some embodiments, as shown in FIG. 2, a skeleton layer (1) is disposed on one side of an anode current collector (3), and a region, not covered by the skeleton layer (1), on the anode current collector (3) is provided with an insulation layer (2). In some embodiments, as shown in FIG. 3, the skeleton layer (1) is disposed on both sides of an anode current collector (3), and a region, not covered by the skeleton layer (1), on the anode current collector (3) is provided with an insulation layer (2). FIG. 4 shows a top view of the structure of the above anode of the present application.

Figure 5:
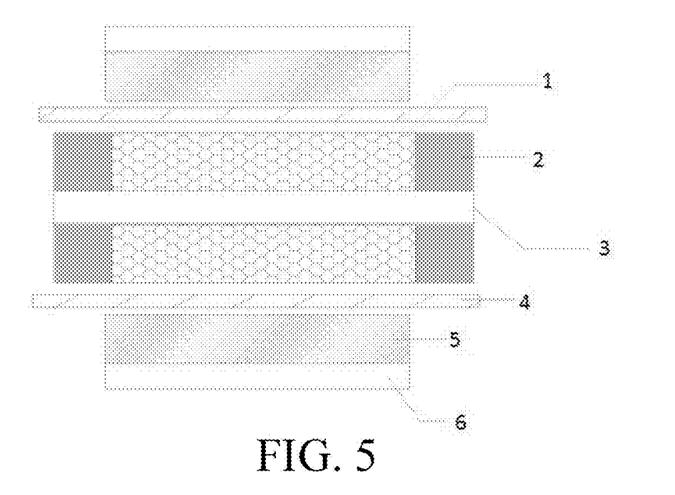
FIG. 5 shows a side view of an electrochemical device of the present application.

In a specific embodiment of the present application, as shown in FIG. 5, the electrochemical device includes: an anode, including an anode current collector (3) and a skeleton layer (1), the skeleton layer (1) being disposed in a central region on the anode current collector (3), and a region, not covered by the skeleton layer (1), on the anode current collector (3) being provided with an insulation layer (2); a cathode, including a cathode current collector (6) and a cathode active material layer (5); and a separator (4), disposed between the anode and the cathode.

The electrochemical device of the present application includes any device in which an electrochemical reaction occurs, and specific examples include all kinds of primary batteries, secondary batteries, fuel cells, solar cells, or capacitors. In particular, the electrochemical device is a lithium secondary battery including a lithium metal secondary battery, a lithium metal secondary battery, a lithium polymer secondary battery or a lithium metal polymer secondary battery.

VI. Electronic Device

The use of the electrochemical device of the present application is not particularly limited and the electrochemical device may be used in any electronic device known in the prior art. In an embodiment, the electrochemical device of the present application may include, but not limited to: a notebook computer, a pen-input computer, a mobile computer, an e-book player, a portable phone, a portable fax machine, a portable copier, a portable printer, a head-mounted stereo headphone, a video recorder, an LCD TV, a portable cleaner, a portable CD player, a Mini disc, a transceiver, an electronic notebook, a calculator, a memory card, a portable recorder, a radio, a backup power source, a motor, a vehicle, a motorcycle, a motorbicycle, a bicycle, a lighting apparatus, a toy, a game console, a clock, an electric tool, a flashing light, a camera, a large battery for household use, and a lithium metal capacitor.

Hereinafter, the lithium metal battery is exemplified as an example and the preparation of the lithium metal battery is described in conjunction with a specific embodiment. Those skilled in the art would understand that the preparation method described in the present application is merely an example, and any other suitable preparation methods fall within the scope of the present application.

EXAMPLES

Examples of the lithium metal battery according to the present application and Comparative Examples for performance evaluation are described below.

I. Preparation of Lithium Metal Battery

1. Preparation of an Anode

Examples 1-20 and Comparative Examples 2-5

A central region on the surface of a punched copper foil current collector (40 mm×60 mm) was coated with a layer of hollow carbon spheres (having the thickness of 80 μm, the area of (38 mm×58 mm) and the porosity of 80%). Hollow carbon spheres, a binder (carboxymethylcellulose sodium, CMC) and styrene-butadiene rubber (SBR) were mixed according to a mass ratio of 96%:2%:2% to obtain an anode slurry. The obtained anode slurry was coated on an anode current collector lithium foil (having the area of 38 mm×58 mm and the thickness of 40 μm), and heated to 200° C. under an argon atmosphere. A pressure of 0.01 MPa was applied to the surface of the lithium foil for 1 min to closely bond the hollow carbon spheres to the surface of the lithium foil so as to form a skeleton structure on the anode. A polypropylene (PP) insulation layer (having the width of 1.5 mm and the thickness of 30 μm) was coated along the four sides of the anode. Blowing drying was performed at 60° C. for 1 hour. The above steps were repeated to form the same skeleton structure and insulation layer on the back surface of the lithium foil. An anode coated with the skeleton layer and the insulation layer on the two surfaces was obtained.

Comparative Examples 1 and 6

Metal lithium was composited onto one side of a 12 μm anode current collector copper foil by physical rolling. The thickness of the metal lithium was controlled to 40 μm by adjusting the pressure of rolls. After the process of cutting, slitting and the like, an anode having no skeleton layer or insulation layer was obtained.

2. Preparation of a Cathode

Lithium cobalt oxide (LiCoO$_2$), a conductive agent (Super P) and polyvinylidene fluoride (PVDF) were mixed according to a mass ratio of 97%:1.4%:1.6%, N-methylpyrrolidone (NMP) was added, and the mixture was stirred uniformly with a vacuum mixer to obtain a cathode slurry. The solid content of the cathode slurry was 72 wt %. The cathode slurry was uniformly coated on a cathode current collector aluminum foil to obtain a cathode film. The obtained cathode film was dried at 85° C., subjected to cold pressing, cutting and slitting, and then dried under vacuum at 85° C. for 4 hours to obtain the cathode.

3. Preparation of an Electrolyte

The composition was prepared according to the compositions of the embodiments and comparative examples in Table 1 under a dry argon atmosphere, and uniformly mixed to obtain the electrolyte.

4. Preparation of a Separator

Polyethylene (PE) having the thickness of 15 μm was used as the separator.

5. Preparation of Lithium Metal Battery

The cathode, the separator and the anode were stacked in sequence such that the separator was in the middle position, and then were fixed to form a laminate structure. After top side sealing, a cell was subjected to electrolyte injection and packaging to obtain the lithium metal battery.

II. Testing Methods

1. Testing Method of 0.1 C Constant-Current Charging Cycle Performance of Lithium Metal Battery The lithium metal battery was placed in a 25° C. incubator and allowed to stand for 30 minutes to bring the lithium metal battery to a constant temperature. The constant-temperature lithium metal battery was charged at a constant current of 0.1 C to a voltage of 4.2 V, then charged at a constant voltage of 4.2 V to a current of 0.05 C, and discharged at a constant current of 0.5 C to a voltage of 3 V, which was a charge and discharge cycle. When the capacity of the first discharge was 100%, the charge and discharge cycle was repeated, and when the discharge capacity was attenuated to 80%, the test was stopped, and the number of cycles was recorded to evaluate the cycle performance of the lithium metal battery at 3-4.2 V.

The lithium metal battery was placed in a 25° C. incubator and allowed to stand for 30 minutes to bring the lithium metal battery to a constant temperature. The constant-temperature lithium metal battery was charged at a constant current of 0.1 C to a voltage of 4.53 V, then charged at a constant voltage of 4.53 V to a current of 0.05 C, and discharged at a constant current of 0.5 C to a voltage of 3 V, which was a charge and discharge cycle. When the capacity of the first discharge was 100%, the charge and discharge cycle was repeated, and when the discharge capacity was attenuated to 80%, the test was stopped, and the number of cycles was recorded to evaluate the cycle performance of the lithium metal battery at 3-4.53 V.

2. Testing Method of 0.3 C Constant-Current Charging Cycle Performance of Lithium Metal Battery The lithium metal battery was placed in a 25° C. incubator and allowed to stand for 30 minutes to bring the lithium metal battery to a constant temperature. The constant-temperature lithium metal battery was charged at a constant current of 0.3 C to a voltage of 4.2 V, then charged at a constant voltage of 4.2 V to a current of 0.05 C, and discharged at a constant current of 0.5 C to a voltage of 3 V, which was a charge and discharge cycle. When the capacity of the first discharge was 100%, the charge and discharge cycle was repeated, and when the discharge capacity was attenuated to 80%, the test was stopped, and the number of cycles was recorded to evaluate the cycle performance of the lithium metal battery at 3-4.2 V.

The lithium metal battery was placed in a 25° C. incubator and allowed to stand for 30 minutes to bring the lithium metal battery to a constant temperature. The constant-temperature lithium metal battery was charged at a constant current of 0.3 C to a voltage of 4.53 V, then charged at a constant voltage of 4.53 V to a current of 0.05 C, and discharged at a constant current of 0.5 C to a voltage of 3 V, which was a charge and discharge cycle. When the capacity of the first discharge was 100%, the charge and discharge cycle was repeated, and when the discharge capacity was attenuated to 80%, the test was stopped, and the number of cycles was recorded to evaluate the cycle performance of the lithium metal battery at 3-4.53 V.

III. Test Results

Table 1 shows the compositions of the lithium metal batteries of the examples and comparative examples, including the composition of the electrolyte and the presence or absence of the skeleton layer in the anode.

TABLE 1

| | Sulfone Compound | Phosphorus Compound | Fluoroether Compound | Lithium Salt (compound H) | Additive (compound I) | 1.2M LiPF$_6$EC-EMC (w:w = 3:7) | DME | Skeleton Layer |
|---|---|---|---|---|---|---|---|---|
| Comparative Example 1 | 26 wt % compound A | 6 wt % compound C | 50 wt % compound F | 1.4 wt % | — | — | — | None |
| Comparative Example 2 | 28 wt % compound A | — | 54 wt % compound F | 1.5 wt % | — | — | — | Yes |
| Comparative Example 3 | 52 wt % compound A | 13 wt % compound C | — | 2.7 wt % | — | — | — | Yes |
| Comparative Example 4 | — | — | — | — | — | Yes | — | Yes |
| Comparative Example 5 | — | — | — | 4 wt % | — | — | 44 wt % | Yes |
| Comparative Example 6 | — | — | — | — | — | Yes | — | None |
| Example 1 | 39 wt % compound A | 10 wt % compound C | 25 wt % compound F | 2.0 wt % | — | — | — | Yes |
| Example 2 | 35 wt % compound A | 8 wt % compound C | 34 wt % compound F | 1.8 wt % | — | — | — | Yes |
| Example 3 | 31 wt % compound A | 8 wt % compound C | 40 wt % compound F | 1.6 wt % | — | — | — | Yes |

TABLE 1-continued

|  | Sulfone Compound | Phosphorus Compound | Fluoroether Compound | Lithium Salt (compound H) | Additive (compound I) | 1.2M LiPF$_6$EC-EMC (w:w = 3:7) | DME | Skeleton Layer |
|---|---|---|---|---|---|---|---|---|
| Example 4  | 26 wt % compound A | 6 wt % compound C  | 50 wt % compound F | 1.4 wt % | — | — | — | Yes |
| Example 5  | 22 wt % compound A | 5 wt % compound C  | 58 wt % compound F | 1.2 wt % | — | — | — | Yes |
| Example 6  | 12 wt % compound A | 39 wt % compound C | 24 wt % compound F | 2.1 wt % | — | — | — | Yes |
| Example 7  | 10 wt % compound A | 38 wt % compound C | 30 wt % compound F | 1.8 wt % | — | — | — | Yes |
| Example 8  | 10 wt % compound A | 35 wt % compound C | 37 wt % compound F | 1.6 wt % | — | — | — | Yes |
| Example 9  | 7 wt % compound A  | 25 wt % compound C | 54 wt % compound F | 1.2 wt % | — | — | — | Yes |
| Example 10 | 26 wt % compound A | 6 wt % compound C  | 50 wt % compound F | 1.4 wt % | 0.5 wt % | — | — | Yes |
| Example 11 | 1 wt % compound A  | 40 wt % compound C | 45 wt % compound F | 1.2 wt % | — | — | — | Yes |
| Example 12 | 40 wt % compound A | 10 wt % compound C | 24 wt % compound F | 2.1 wt % | — | — | — | Yes |
| Example 13 | 25 wt % compound A | 1 wt % compound C  | 49 wt % compound F | 2.0 wt % | — | — | — | Yes |
| Example 14 | 20 wt % compound A | 15 wt % compound C | 20 wt % compound F | 4.0 wt % | — | — | — | Yes |
| Example 15 | 16 wt % compound A | 6 wt % compound C  | 70 wt % compound F | 0.6 wt % | — | — | — | Yes |
| Example 16 | 34 wt % compound A | 31 wt % compound C | 1 wt % compound F  | 2.8 wt % | — | — | — | Yes |
| Example 17 | 31 wt % compound B | 6 wt % compound C  | 47 wt % compound F | 1.4 wt % | — | — | — | Yes |
| Example 18 | 27 wt % compound A | 3 wt % compound D  | 52 wt % compound F | 1.4 wt % | — | — | — | Yes |
| Example 19 | 27 wt % compound A | 3 wt % compound E  | 52 wt % compound F | 1.4 wt % | — | — | — | Yes |
| Example 20 | 23 wt % compound A | 6 wt % compound C  | 56 wt % compound G | 1.4 wt % | — | — | — | Yes |

The sulfone compounds used in Table 1 have the following structure:

(compound A)

(compound B)

The phosphorus compounds used in Table 1 have the following structure:

(compound C)

(compound D)

(compound E)

The fluoroether compounds used in Table 1 have the following structure:

(compound F)

(compound G)

The lithium salt used in Table 1 has the following structure:

(compound H)

The additive used in Table 1 has the following structure:

(compound I)

Table 2 shows the number of cycles at 3-4.2 V or 3-4.53 V of the lithium metal batteries of the examples and comparative examples under a 0.1 C or 0.3 C charging condition.

|  | Number of Cycles at 3-4.2 V | | Number of Cycles at 3-4.53 V | |
| --- | --- | --- | --- | --- |
|  | 0.1 C charging 0.5 C discharging | 0.3 C charging 0.5 C discharging | 0.1 C charging 0.5 C discharging | 0.3 C charging 0.5 C discharging |
| Comparative Example 1 | 282 | 67 | 265 | 41 |
| Comparative Example 2 | 0 | 0 | 0 | 0 |
| Comparative Example 3 | 5 | 4 | 6 | 3 |
| Comparative Example 4 | 13 | 13 | 8 | 8 |
| Comparative Example 5 | 282 | 180 | 3 | 3 |
| Comparative Example 6 | 40 | 35 | 26 | 19 |
| Example 1 | 275 | 171 | 259 | 142 |
| Example 2 | 274 | 173 | 256 | 146 |
| Example 3 | 275 | 177 | 259 | 148 |
| Example 4 | 282 | 180 | 265 | 142 |
| Example 5 | 284 | 183 | 266 | 147 |
| Example 6 | 271 | 169 | 248 | 139 |
| Example 7 | 275 | 172 | 249 | 141 |
| Example 8 | 279 | 170 | 252 | 147 |
| Example 9 | 279 | 178 | 265 | 149 |
| Example 10 | 282 | 191 | 271 | 159 |
| Example 11 | 269 | 166 | 244 | 135 |
| Example 12 | 278 | 172 | 260 | 144 |
| Example 13 | 258 | 168 | 244 | 132 |
| Example 14 | 272 | 165 | 258 | 131 |
| Example 15 | 255 | 152 | 242 | 132 |
| Example 16 | 203 | 145 | 198 | 121 |
| Example 17 | 281 | 181 | 264 | 143 |
| Example 18 | 280 | 179 | 266 | 140 |
| Example 19 | 280 | 178 | 266 | 141 |
| Example 20 | 283 | 182 | 265 | 141 |

In Comparative Example 1, only the electrolyte of the present application was used rather than using the anode having the skeleton layer, and the obtained lithium metal battery had a very short cycle life when subjected to a large-rate charging cycle (0.3 C charging) at a high voltage (3-4.53 V). However, as shown in Example 4, after the electrolyte of the present application was used in combination with the anode having the skeleton layer of the present application, the cycle life of the lithium metal battery was significantly improved.

The electrolyte in Comparative Example 2 was free of a phosphorus compound, so the electrolyte was solidified at room temperature, and thus could not be injected into the cell for cycling. Therefore, the phosphorus compound is indispensable for reducing the melting point of the electrolyte and improving the temperature use window of the electrolyte.

The electrolyte in Comparative Example 3 was free of a fluoroether compound, so the viscosity of the electrolyte was large, and it was difficult to wet the separator and the electrode, thereby greatly shortening the cycle life. Therefore, the addition of a fluoroether compound to the electrolyte to lower the viscosity can significantly improve the cycle life of the lithium metal battery.

The electrolyte in Comparative Example 5 was free of a sulfone compound, a phosphorus compound and a fluoroether compound, and thus, was not tolerant to a high voltage. Even if the electrolyte is used in combination with an anode having a skeleton layer, the obtained lithium metal battery still cannot be normally cycled.

In Comparative Example 6, a conventional carbonate solvent electrolyte system was used. This type of electrolyte is unstable to lithium, has low coulombic efficiency, and consumes a large amount of lithium per cycle, and the lithium metal deposition morphology is of a needle-like structure (as shown in FIG. 1A), so it is easy to cause a short circuit. Comparative Example 4 used an anode having a skeleton layer on the basis of Comparative Example 6. The skeleton layer enables the anode to have larger specific surface area and more reaction sites and to react with the electrolyte more intensely, thereby greatly shortening the cycle life.

The anode in the lithium metal battery of Examples 1-20 had a skeleton layer, and the electrolyte used therein included about 1 wt % to about 40 wt % of a sulfone compound, about 1 wt % to about 40 wt % of a phosphorus compound and about 1 wt % to about 70 wt % of a fluoroether compound, based on the total weight of the electrolyte. The results show that compared to Comparative Examples 1-6, the lithium metal batteries of Examples 1-20 have superior cycle performance and particularly exhibit exceptionally excellent cycle performance at a high voltage (3-4.53 V) under a large-rate charging cycle (0.3 C charging).

The electrolyte in Embodiment 10 further included an additive, which further enhanced the cycle performance of the lithium metal battery.

References throughout the specification to "embodiments," "partial embodiments," "one embodiment," "another example," "example," "specific example" or "partial examples" mean that at least one embodiment or example of the application comprises specific features, structures, materials or characteristics described in the embodiments or examples. Thus, the descriptions appear throughout the specification, such as "in some embodiments," "in an embodiment," "in one embodiment," "in another example," "in an example," "in a particular example" or "for example," are not necessarily the same embodiment or example in the application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:

1. An electrochemical device, comprising:
an anode, comprising an anode current collector and a skeleton layer, the skeleton layer being disposed in a central region on the anode current collector, and a region of the anode current collector not covered by the skeleton layer is provided with an insulation layer;
a cathode; and
an electrolyte, comprising about 1 wt % to about 40 wt % of a sulfone compound, about 1 wt % to about 40 wt % of a phosphorus compound and about 1 wt % to about 70 wt % of a fluoroether compound, based on a total weight of the electrolyte;
wherein the sulfone compound is selected from one or more of the following:

the phosphorus compound is selected from one or more of the following:

the fluoroether compound is selected from one or more of the following:

the skeleton layer is selected from one or more of the following: porous carbon, carbon nanotubes, carbon fibers and hollow carbon spheres; and
the skeleton layer has a porosity of about 30% to about 95%.

2. The electrochemical device according to claim 1, wherein the skeleton layer is doped with one or more of the following elements: N, S, P and O.

3. The electrochemical device according to claim 1, wherein the skeleton layer is about 0.5 mm to about 50 mm from an edge of the anode current collector.

4. The electrochemical device according to claim 1, wherein the skeleton layer has a conductivity of about $10^{-2}$ S/cm to about $10^{-8}$ S/cm.

5. The electrochemical device according to claim 1, wherein a width of the insulation layer ranges from about 0.5 mm to about 10 mm.

6. The electrochemical device according to claim 1, wherein the insulation layer is formed of an organic polymer material or an inorganic material, the organic polymer material being selected from one or more of the following: polyimide, polyvinyl fluoride, polyetheretherketone, polyester, polyethylene, polypropylene, polyvinylidene chloride, polytetrafluoroethylene and polyethylene terephthalate (PET), and the inorganic material being selected from one or more of aluminum oxide, aluminum hydroxide and boron nitride.

7. The electrochemical device according to claim 1, wherein the electrolyte further comprises about 0.01 wt % to about 10 wt % of an additive based on the total weight of the electrolyte.

8. The electrochemical device according to claim 7, wherein the additive is selected from one or more of the following: vinylethylene carbonate (VEC), lithium bis(oxalate)borate (LiBOB), lithium difluoro(oxalato)borate (LiDFOB), lithium tetrafluoroborate (LiBF$_4$), methylene methanedisulfonate (MMDS), 4-trifluoromethyl ethylene carbonate, 1,3,2-dioxathiolane-2,2-dioxide (DTD), fluoroethylene carbonate (FEC), ethylene sulfite (ES), vinylene carbonate (VC), succinic anhydride (SA), propylene sulfite (PS), prop-1-ene-1,3-sultone, bis(trimethylsilyl)sulfate, lithium nitrate (LiNO$_3$), N-butyl,methylpyrrolidinium bis((trifluoromethyl)sulfonyl)imide, N-propyl,methylpiperidine bis((trifluoromethyl)sulfonyl)imide, 1,3-dioxane, 1,4-dioxane, 1,2-bis(cyanoethoxy)ethane, adiponitrile, 1,3,5-pentanetricarbonitrile, fumaronitrile and 1,2,3-tris(2-cyanoethoxy)propane.

9. The electrochemical device according to claim 1, wherein the electrolyte comprises about 0.1M to about 4M lithium salt, the lithium salt being selected from one or more of the following: lithium perchlorate (LiClO$_4$), lithium hexafluoroarsenate (LiAsF$_6$), lithium hexafluorophosphate (LiPF$_6$), lithium bis(trifluoromethanesulfonyl)imide (LiTFSI), lithium bis(fluorosulfonyl)imide (LiFSI), lithium bis(oxalate)borate (LiBOB), lithium difluoro(oxalato)borate (LiDFOB), lithium tetrafluoroborate (LiPF$_4$), lithium trifluoromethanesulfonate (LiTFA) and lithium difluorophosphate (LiPO$_2$F$_2$).

10. An electronic device, comprising an electrochemical device, the electro chemical device comprises:
- an anode, comprising an anode current collector and a skeleton layer, the skeleton layer being disposed in a central region on the anode current collector, and a region of the anode current collector not covered by the skeleton layer is provided with an insulation layer;
- a cathode; and
- an electrolyte, comprising about 1 wt % to about 40 wt % of a sulfone compound, about 1 wt % to about 40 wt % of a phosphorus compound and about 1 wt % to about 70 wt % of a fluoroether compound, based on a total weight of the electrolyte,
- wherein the sulfone compound is selected from one or more of the following:

, or the phosphorus compound is selected from one or more of the following:

, or and
the fluoroether compound is selected from one or more of the following:

the skeleton layer is selected from one or more of the following: porous carbon, carbon nanotubes, carbon fibers and hollow carbon spheres; and
the skeleton layer has a porosity of about 30% to about 95%.

* * * * *